(12) United States Patent
Kim et al.

(10) Patent No.: US 11,300,454 B2
(45) Date of Patent: Apr. 12, 2022

(54) MULTI-MODE THERMAL IMAGING DEVICE AND OPERATION METHOD THEREOF

(71) Applicant: KOREA BASIC SCIENCE INSTITUTE, Daejeon (KR)

(72) Inventors: Dong Uk Kim, Daejeon (KR); Ki Soo Chang, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 0 days.

(21) Appl. No.: 15/733,806

(22) PCT Filed: May 22, 2019

(86) PCT No.: PCT/KR2019/095017
§ 371 (c)(1),
(2) Date: Nov. 30, 2020

(87) PCT Pub. No.: WO2019/235908
PCT Pub. Date: Dec. 12, 2019

(65) Prior Publication Data
US 2021/0231501 A1    Jul. 29, 2021

(30) Foreign Application Priority Data
Jun. 5, 2018  (KR) .......................... 10-2018-0064654

(51) Int. Cl.
*G01J 3/26* (2006.01)
*G01J 3/42* (2006.01)
(Continued)

(52) U.S. Cl.
CPC . *G01J 5/48* (2013.01); *G01J 3/26* (2013.01); *G01J 3/42* (2013.01); *G02B 21/0036* (2013.01);
(Continued)

(58) Field of Classification Search
CPC ......... G01J 2003/425; G01J 2005/0077; G01J 3/027; G01J 3/26; G01J 3/42; G01J 5/48;
(Continued)

(56) References Cited

U.S. PATENT DOCUMENTS

2002/0126732 A1   9/2002  Shakouri et al.
2019/0120753 A1*  4/2019  Prater .................. G01N 23/207

FOREIGN PATENT DOCUMENTS

JP    2004021004 A   1/2004
JP    2008197161 A   8/2008
(Continued)

OTHER PUBLICATIONS

PCT International Search Report & Written Opinion, dated Sep. 3, 2019, with English translation of International Search Report, for App. No. PCT/KR2019/095017, 9 pages.

*Primary Examiner* — Hina F Ayub
(74) *Attorney, Agent, or Firm* — Dorsey & Whitney LLP (57) ABSTRACT

Disclosed are a multi-mode thermal imaging device and an operation method thereof. According to an embodiment of the present invention, in a first mode, a first sample is scanned with an optical signal from a light source, signals reflected from the first sample by the scanning are detected separately for each wavelength, a reflectance change spectrum according to the wavelength is derived on the basis of the signals detected separately for each wavelength, a wavelength is selected on the basis of the derived reflectance change spectrum, and a thermal image of the first sample is obtained, through a filter, by detecting an optical signal limited to the selected wavelength from among the signals reflected from the first sample. In a second mode, thermal radiation of a second sample is detected to obtain a thermal image of the second sample.

9 Claims, 5 Drawing Sheets

(51) Int. Cl.
   *G02B 21/00*     (2006.01)
   *G01J 5/48*      (2022.01)
   *G01J 5/00*        (2022.01)

(52) U.S. Cl.
   CPC . *G01J 2003/425* (2013.01); *G01J 2005/0077* (2013.01)

(58) Field of Classification Search
   CPC ............ G02B 21/0028; G02B 21/0036; G02B 21/0064
   See application file for complete search history.

(56) References Cited

FOREIGN PATENT DOCUMENTS

| | | | |
|---|---|---|---|
| JP | 2013041142 | A | 2/2013 |
| KR | 19990082235 | A | 11/1999 |
| KR | 101336946 | B1 | 12/2013 |
| KR | 101350976 | B1 | 1/2014 |
| KR | 101555153 | B1 | 10/2015 |
| KR | 1020160107921 | B1 | 1/2017 |
| KR | 101735208 | B1 | 5/2017 |
| KR | 1020170077026 | B1 | 3/2020 |

\* cited by examiner

MULTI-MODE THERMAL IMAGING DEVICE AND OPERATION METHOD THEREOF

TECHNICAL FIELD

Embodiments relate to a multi-mode thermal imaging device and an operation method thereof.

BACKGROUND ART

With the recent development of semiconductor manufacturing process technology, fine patterning and three-dimensional (3D) high integration have been achieved, and heat generated during the operation of a semiconductor device is a major factor deteriorating the performance and reliability of the semiconductor device. For this reason, there is a need for a device capable of obtaining an accurate thermal image of a submicron fine pattern.

As a related prior art, there has been published Korean Patent Publication No. 10-1336946 (Title of the Invention: Failure Analysis Apparatus and Method Using Measurement of Heat Generation Distribution, Applicant: the Korea Basic Science Institute). The publication discloses a sample loading unit for loading a sample, a light source for illuminating the sample, a power supply unit for generating a driving signal in order to periodically heat the sample, a detection unit for detecting reflected light from the surface of the sample, and a signal generator for synchronizing the detection unit with the driving signal of the power supply unit.

DISCLOSURE OF INVENTION

Technical Solutions

According to an aspect, there is provided a multi-mode thermal imaging device including a microscope; a spectroscope; a controller; and an infrared thermal imager. Here, the multi-mode thermal imaging device operates in one of multiple modes, wherein in a first mode among the multiple modes, the microscope scans a first sample with an optical signal from a light source, the spectroscope detects signals reflected from the first sample by separating them for each wavelength, and the controller derives a reflectance change spectrum according to the wavelength on the basis of the signals detected separately for each wavelength, selects a wavelength on the basis of the derived reflectance change spectrum, and obtains a thermal image of the first sample by detecting, through a filter, an optical signal limited to the selected wavelength from among the signals reflected from the first sample, and wherein in a second mode among the multiple modes, the infrared thermal imager detects thermal radiation of a second sample to obtain a thermal image of the second sample.

The light source may correspond to a white light source.

In the first mode, the controller may obtain a reflectance change for each wavelength by analyzing the signals detected separately for each wavelength in a frequency domain, and derive the reflectance change spectrum by mapping the reflectance change obtained for each wavelength to each wavelength.

In the first mode, the controller may select a wavelength maximizing a reflectance change in the derived reflectance change spectrum.

In the first mode, the controller may analyze, in a frequency domain, the optical signal limited to the selected wavelength from among the signals reflected from the first sample by the scanning with the optical signal from the light source, and obtain the thermal image of the first sample through a result of the analyzing.

In the second mode, a sliding mirror and an infrared object lens in the multi-mode thermal imaging device may be aligned.

The multi-mode thermal imaging device may further include a power supply configured to apply an alternating current (AC) bias signal or a direct current (DC) bias signal to the first sample or the second sample; a sliding mirror; and an infrared object lens. The infrared thermal imager may detect the thermal radiation through the sliding mirror and the infrared object lens.

The power supply may apply the AC bias signal to the first sample in the first mode and apply the DC bias signal to the second sample in the second mode.

According to an aspect, there is provided an operation method of a multi-mode thermal imaging device, the operation method including in a first mode among multiple modes, scanning a first sample with an optical signal; detecting signals reflected from the first sample by separating them for each wavelength, and deriving a reflectance change spectrum according to the wavelength on the basis of the signals detected separately for each wavelength; selecting a wavelength on the basis of the derived reflectance change spectrum; and obtaining a thermal image of the first sample by detecting, through a filter, an optical signal limited to the selected wavelength from among the signals reflected from the first sample, and in a second mode among the multiple modes, detecting thermal radiation of a second sample to obtain a thermal image of the second sample.

Effects of the Invention

According to embodiments, it is possible to obtain thermal images of various samples. According to embodiments, it is possible to obtain not only a thermal image or temperature distribution of the surface of a sample but also a thermal image or temperature distribution of the inside of a sample by performing confocal detection. According to embodiments, it is possible to achieve high resolution and high sensitivity by performing measurement by selecting an optimal probe light source from among white light sources of a visible band, and to obtain thermal images of various samples having regions of interest from several μm to several mm by measuring infrared thermal radiation.

BEST MODE FOR CARRYING OUT THE INVENTION

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Figure 1:
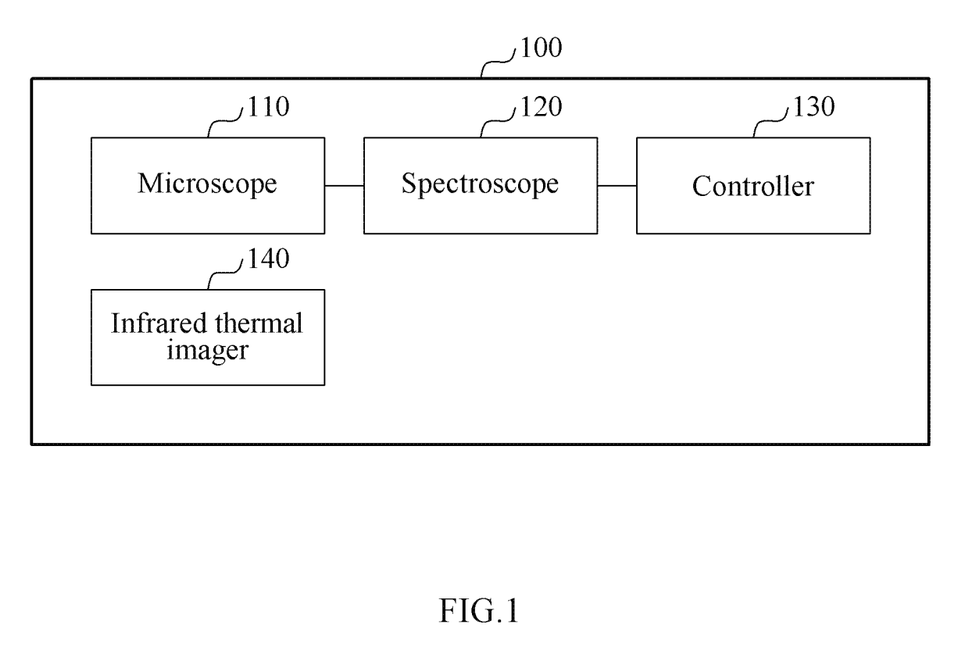
FIG. 1 is a block diagram illustrating a multi-mode thermal imaging device according to an embodiment.

FIG. 1 is a block diagram illustrating a multi-mode thermal imaging device according to an embodiment.

In response to mode selection, a multi-mode thermal imaging device 100 operates in a first mode. In the first mode, a microscope 110, a spectroscope 120, and a controller 130 in the multi-mode thermal imaging device 100 operate mainly. The microscope 110 may correspond to a confocal microscope or a confocal heat reflection microscope.

A bias signal is applied to a first sample under the control of the controller 130. For example, an alternating current (AC) bias signal is applied to the first sample. When the bias signal is applied to the first sample, heat that changes according to a bias signal frequency f is generated in the first sample. The first sample may have reflected light in a visible or near-infrared band.

The microscope 110 scans the first sample with an optical signal from a light source. The light source may correspond to, for example, a white light source. The optical signal from the light source may be a mixture of signals of a visible or near-infrared band. Signals are reflected from the first sample by scanning of the microscope 110.

The spectroscope 120 detects the signals reflected from the first sample by separating them for each wavelength. The spectroscope 120 may sequentially detect a signal of each wavelength band from among the signals reflected from the first sample using a linear variable filter and a photodetector. For example, when a bandpass wavelength of the linear variable filter corresponds to $\lambda_1$, the spectroscope 120 may detect a signal with a wavelength of $\lambda 1$ from among the signals reflected from the first sample using the corresponding linear variable filter and the photodetector. After the signal with the wavelength of $\lambda_1$ is detected, the bandpass wavelength of the linear variable filter may be adjusted to $\lambda_2$. In this example, the spectroscope 120 may detect a signal with a wavelength of $\lambda_2$ from among the signals reflected from the first sample using the corresponding linear variable filter and the photodetector. In this way, the spectroscope 120 may sequentially detect the signal of each wavelength band from among the signals reflected from the first sample.

The controller 130 derives a reflectance change spectrum according to the wavelength on the basis of the signals detected by the spectroscope 120 for each wavelength, separately. Here, the reflectance change spectrum according to the wavelength may represent a change in reflectance for the signals detected separately for each wavelength. When the spectroscope 120 detects a signal with a wavelength of $\lambda_1$, the controller 130 may analyze the signal with the wavelength of $\lambda 1$ in a frequency domain to obtain a reflectance change of the first sample for the signal with the wavelength of $\lambda_1$. For example, the controller 130 may obtain the reflectance change of the first sample for the signal with the wavelength of $\lambda_1$ according to an equation of $\Delta R_f/R_0$. Here, $R_0$ denotes a direct current (DC) component included in a frequency domain signal of the signal with the wavelength of $\lambda_1$, and $\Delta R_f$ denotes a frequency component of a bias signal included in the frequency domain signal. Similarly, when the spectroscope 120 detects a signal with a wavelength of $\lambda_2$, the controller 130 may analyze the signal with the wavelength of $\lambda_2$ in a frequency domain to obtain a reflectance change of the first sample for the signal with the wavelength of $\lambda_2$. In this way, the controller 130 may obtain a reflectance change of the first sample for a signal of each wavelength, and derive the reflectance change spectrum by mapping the reflectance change for each wavelength to each wavelength. The reflectance change spectrum may include a reflectance change for a signal with a wavelength of $\lambda_1$, a reflectance change for a signal with a wavelength of $\lambda_2, \ldots$, and a reflectance change for a signal with a wavelength of $\lambda_n$.

The controller 130 selects a wavelength on the basis of the derived reflectance change spectrum. The controller 130 may select a wavelength that maximizes the reflectance change. An optical signal with the selected wavelength may correspond to a probe optical signal. The controller 130 may limit (or set) the bandpass wavelength of the linear variable filter to the selected wavelength.

Even when the controller 130 selects a wavelength on the basis of the derived reflectance change spectrum, the light source continues outputting optical signals, and signals are reflected from the first sample. The spectroscope 120 detects, through the linear variable filter, an optical signal limited to the selected wavelength from among the signals reflected from the first sample.

The controller 130 analyzes the signal detected by the spectroscope 120 in the frequency domain, and obtains a thermal image of the first sample through a result of the analysis.

In response to mode selection, the multi-mode thermal imaging device 100 operates in a second mode. In the second mode, the controller 130 and an infrared thermal imager 140 in the multi-mode thermal imaging device 100 operate mainly.

In the second mode, a bias signal is applied to a second sample under the control of the controller 130. For example, a DC bias signal is applied to the second sample. When the bias signal is applied to the second sample, constant heat is generated in the second sample. The second sample may have little or no reflected light.

The infrared thermal imager 140 obtains a thermal image of the second sample by detecting thermal radiation of the second sample.

According to an embodiment, the multi-mode thermal imaging device 100 may operate in various modes. Thus, it is possible to obtain thermal images of various samples with a single device. In addition, the multi-mode thermal imaging device 100 may obtain high-resolution, high-sensitivity thermal images of samples and thus, may greatly help with analyzing causes of heat generated on the surface of or inside of various samples.

Figure 2:
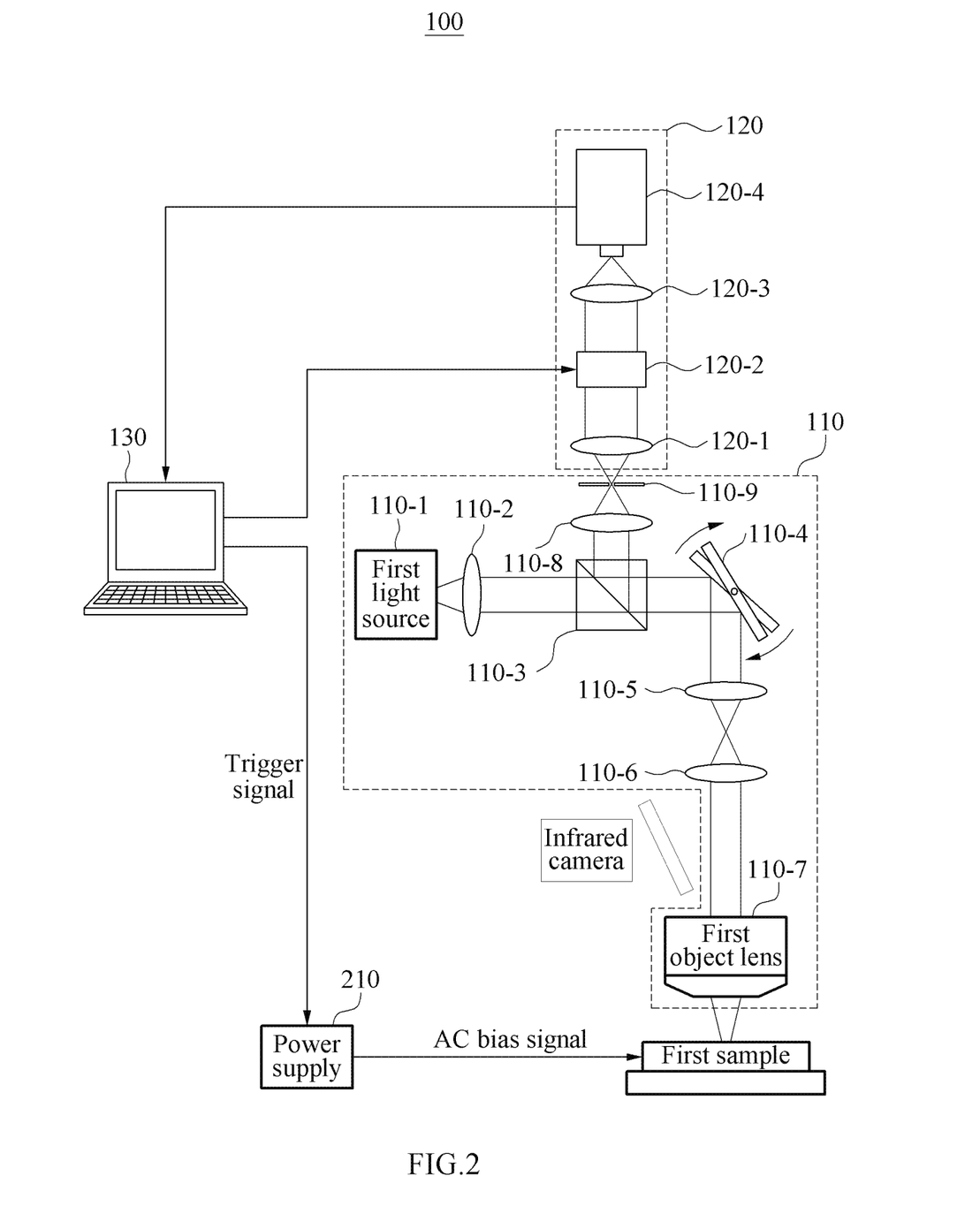
FIG. 2 illustrates an operation of a multi-mode thermal imaging device in a first mode according to an embodiment.

FIG. 2 illustrates an operation of a multi-mode thermal imaging device in a first mode according to an embodiment.

Referring to FIG. 2, the microscope 110 includes a light source 110-1, a collimating lens 110-2, a beam splitter 110-3, an x-axis and y-axis scan mirror 110-4, a scan lens 110-5, a tube lens 110-6, a first object lens 110-7, a condensing lens 110-8, and a pinhole 110-9.

The light source 110-1 and the collimating lens 110-2 may constitute an illuminator. The x-axis and y-axis scan mirror 110-4, the scan lens 110-5, the tube lens 110-6, and the first object lens 110-7 may constitute an optical scanner. The condensing lens 110-8 and the pinhole 110-9 may constitute a confocal detector.

The spectroscope 120 may include a linear variable filter 120-2, a plurality of lenses 120-1 and 120-3, and a photodetector 120-4.

The controller 130 controls a power supply 210. In response to receiving a trigger signal from the controller 130, the power supply 210 applies an AC bias signal to a first sample. When the AC bias signal is applied to the first sample, heat that changes according to a bias signal frequency is generated in the first sample.

In a state in which the AC bias signal is applied to the first sample, the light source 110-1 may output optical signals. The light source 110-1 may correspond to a white light source. The optical signals output from the light source 110-1 may illuminate the first sample after passing through the collimating lens 110-2, the beam splitter 110-3, the x-axis and y-axis scan mirror 110-4, the scan lens 110-5, the tube lens 110-6, and the first object lens 110-7. When the optical signals illuminate the first sample, the signals are reflected by the first sample. In this example, the signals reflected by the first sample may include signals reflected on a desired focal plane of the first sample and signals reflected on an undesired focal plane of the first sample.

The signals reflected by the first sample are input into the spectroscope 120 after passing through the first object lens 110-7, the tube lens 110-6, the scan lens 110-5, the x-axis and y-axis scan mirror 110-4, the beam splitter 110-3, the condensing lens 110-8, and the pinhole 110-9. Here, only the signals reflected on the desired focal plane may pass through the pinhole 110-9, and the other signals may not pass through the pinhole 110-9. In other words, signals reflected from a desired focal plane, such as the surface or the inside of a sample, may be input to the spectroscope 120.

Signals passing through the pinhole 110-9 (or signals reflected by the first sample) pass through the lens 120-1 and are input into the linear variable filter 120-2. The linear variable filter 120-2 may sequentially pass a signal of each wavelength band from among the signals passing through the pinhole 110-9 (or the signals reflected by the first sample) under the control of the controller 130. The photodetector 120-4 may sequentially detect the signal of each wavelength band.

The controller 130 may sequentially receive the signal of each wavelength band from the photodetector 120-4, and analyze the signal of each wavelength band in a frequency domain to obtain a reflectance change of the signal of each wavelength band. The controller 130 may derive a reflectance change spectrum by mapping the reflectance change of the signal of each wavelength band to each wavelength band. For example, when the respective wavelength bands of signals reflected by the first sample are $\lambda_1, \lambda_2, \ldots, \lambda_n$, and the reflectance changes of the signals for the respective wavelength bands are $X_1, X_2, \ldots, X_n$, the controller 130 may derive a reflectance change spectrum by mapping $\lambda_1$ to $X_1$, mapping $\lambda_2$ to $X_2$, and mapping $\lambda_n$ to $X_n$.

The controller 130 may select a wavelength that maximizes the reflectance change in the derived reflectance change spectrum. For example, it may be assumed that the controller 130 selects $\lambda_2$ in the derived reflectance change spectrum. The controller 130 may limit (or set) the bandpass wavelength of the linear variable filter 120-2 to $\lambda_2$.

If the bandpass wavelength band of the linear variable filter 120-2 is limited to $\lambda_2$, the spectroscope 120 may continuously detect an optical signal with $\lambda_2$ among the signals reflected from the first sample.

The controller 130 may analyze the optical signal with $\lambda_2$ in the frequency domain, and obtain a thermal image of the first sample through a result of the analysis. For example, the controller 130 may obtain a reflectance change by analyzing, in the frequency domain, the optical signal limited to $\lambda 2_2$ among the signals reflected from the first sample. Since the reflectance change is associated with a change in the temperature of the sample, the controller 130 may obtain a thermal image of the first sample by obtaining the reflectance change.

The linear variable filter 120-2 may be positioned between the collimating lens 110-2 and the beam splitter 110-3. In this example, a signal of each wavelength band among the optical signals from the light source 110-1 may sequentially illuminate the first sample through the linear variable filter 120-2. In other words, the bandpass wavelength of the linear variable filter 120-2 may be sequentially changed under the control of the controller 130. Each time the bandpass wavelength of the linear variable filter 120-2 is sequentially changed, an optical signal with the newly set bandpass wavelength may illuminate the first sample. For each wavelength, the photodetector 120-4 may detect a signal reflected from the first sample, and the controller 130 may calculate a reflectance change of the optical signal of each wavelength to derive a reflectance change spectrum.

Figure 3:
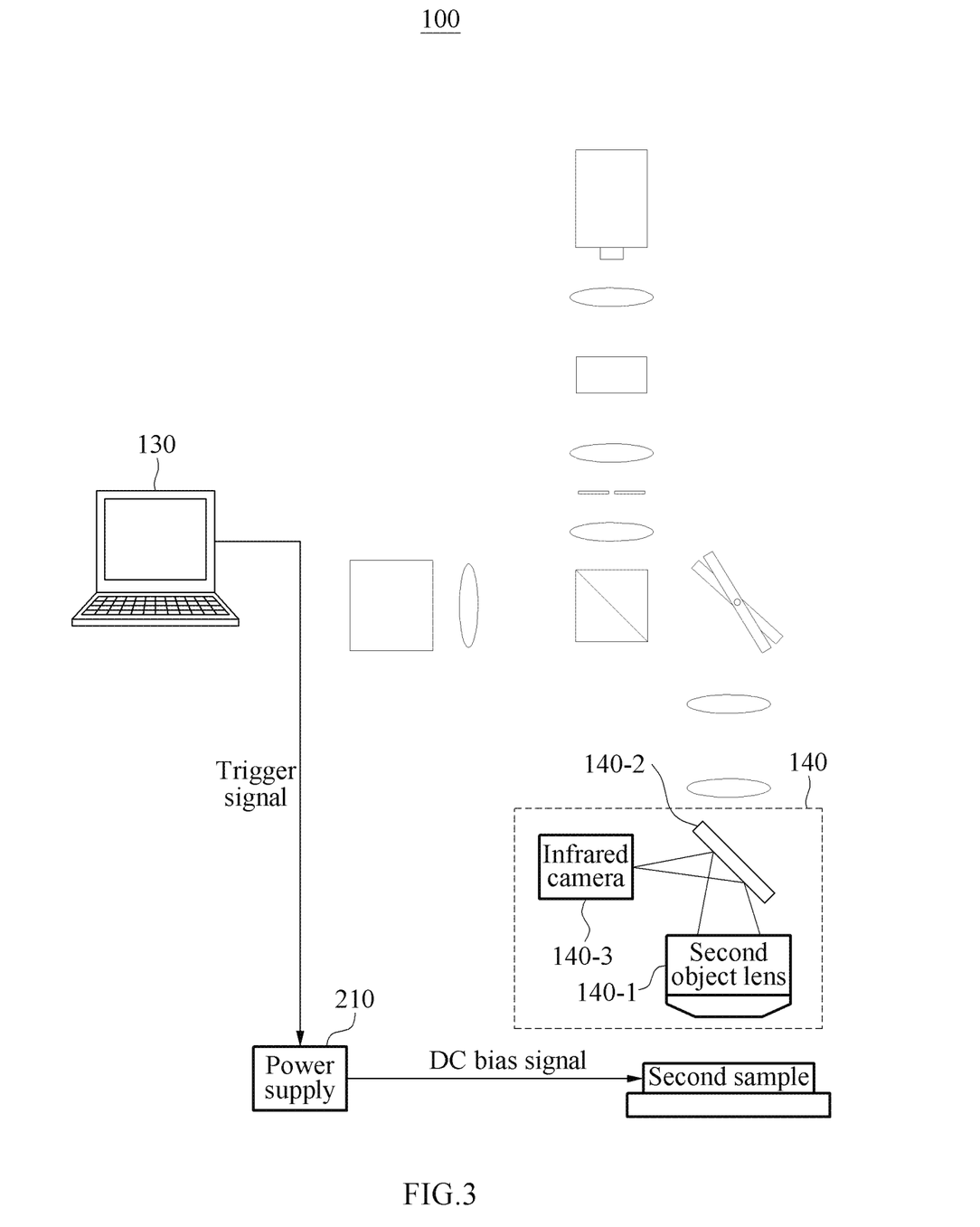
FIG. 3 illustrates an operation of a multi-mode thermal imaging device in a second mode according to an embodiment.

FIG. 3 illustrates an operation of a multi-mode thermal imaging device in a second mode according to an embodiment.

Referring to FIG. 3, the infrared thermal imager 140 may include an infrared camera 140-3, a sliding mirror 140-2, and a second object lens 140-1. The infrared camera 140-3 may correspond to a mid-infrared or long-infrared camera. The second object lens 140-1 may correspond to an infrared object lens. For example, the second object lens 140-1 may correspond to an infrared object lens with 4× magnification. This may improve the field of view up to several millimeters (mm).

In the second mode, optical axes of the second object lens 140-1 and the sliding mirror 140-2 may be aligned. Although the optical axes of the second object lens 140-1 and the sliding mirror 140-2 are not aligned in the first mode, the optical axes of the second object lens 140-1 and the sliding mirror 140-2 may be aligned in the second mode.

The controller 130 controls the power supply 210. In response to receiving a trigger signal from the controller 130, the power supply 210 applies a DC bias signal to a second sample. When the DC bias signal is applied to the second sample, constant heat is generated in the second sample.

In a state in which the DC bias signal is applied to the second sample, the infrared camera 140-3 may obtain a thermal image of the second sample by detecting thermal radiation of the second sample through the second object lens 140-1 and the sliding mirror 140-2.

Figure 4:
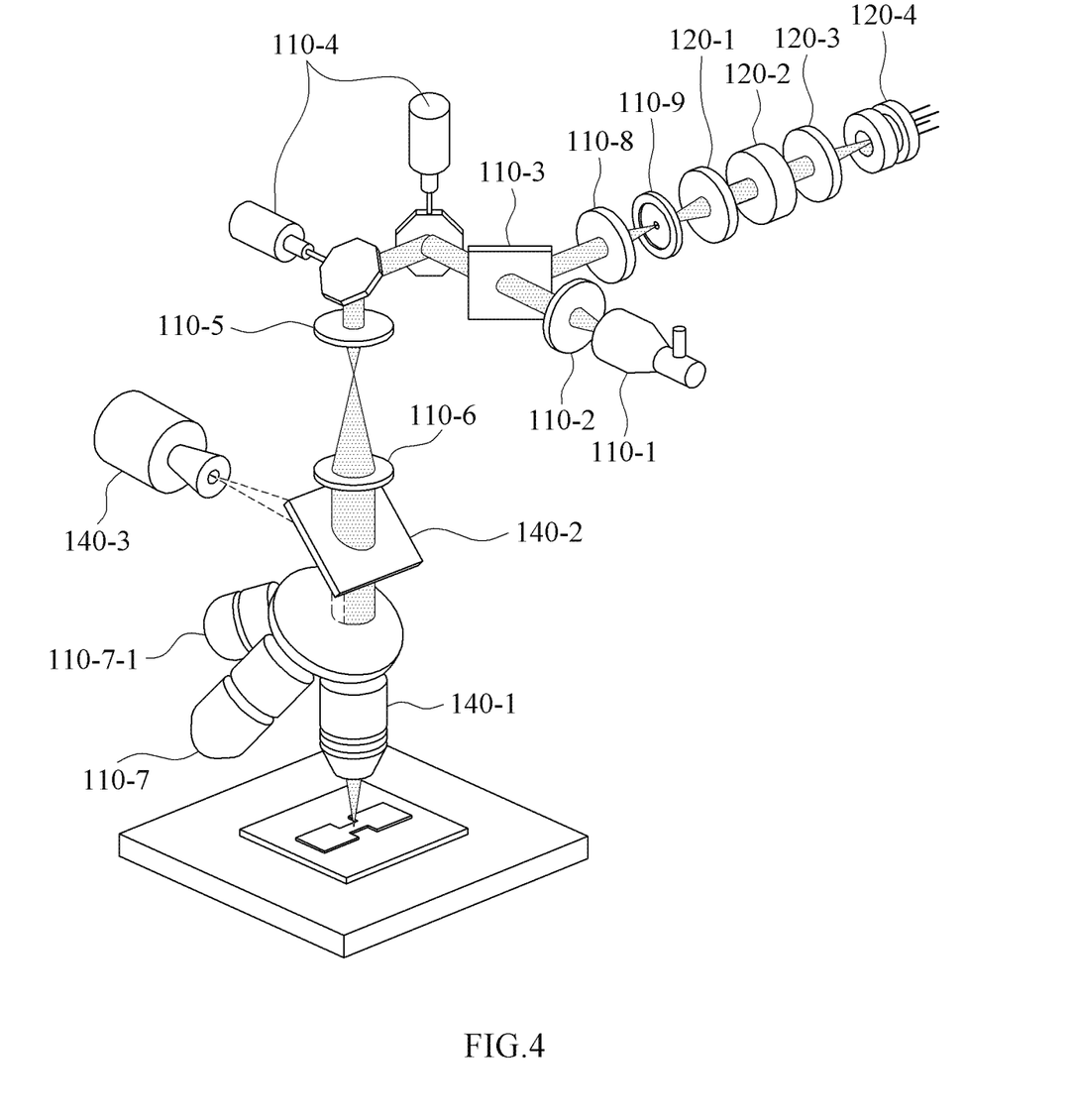
FIG. 4 illustrates a multi-mode thermal imaging device according to an embodiment.

FIG. 4 illustrates a multi-mode thermal imaging device according to an embodiment.

FIG. 4 is a perspective view of the multi-mode thermal imaging device 100.

Referring to FIG. 4, the first object lens 110-7, the second object lens 140-1, and a third object lens 110-7-1 are mounted on a turret. The first object lens 110-7 or the third object lens 110-7-1 may be used in the first mode, and the second object lens 140-1 may be used in the second mode.

As described with reference to FIGS. 1 to 3, the multi-mode thermal imaging device 100 may obtain thermal images of various samples. Further, the multi-mode thermal imaging device 100 may obtain not only a thermal image or temperature distribution of the surface of a sample, but also a thermal image or temperature distribution of the inside of a sample. In addition, since an optimal probe light source of a visible band is used, the spatial resolution of the multi-mode thermal imaging device 100 may correspond to 0.4 micrometers (μm), such that high-sensitivity, high-resolution thermal images may be obtained. When the infrared thermal imager 140 is used, thermal images of samples with regions of interest of various sizes (for example, from tens of μm to several mm) may be obtained.

The description provided with reference to FIGS. 1 to 3 also applies to the description of FIG. 4, and thus a detailed description will be omitted for conciseness.

Figure 5:
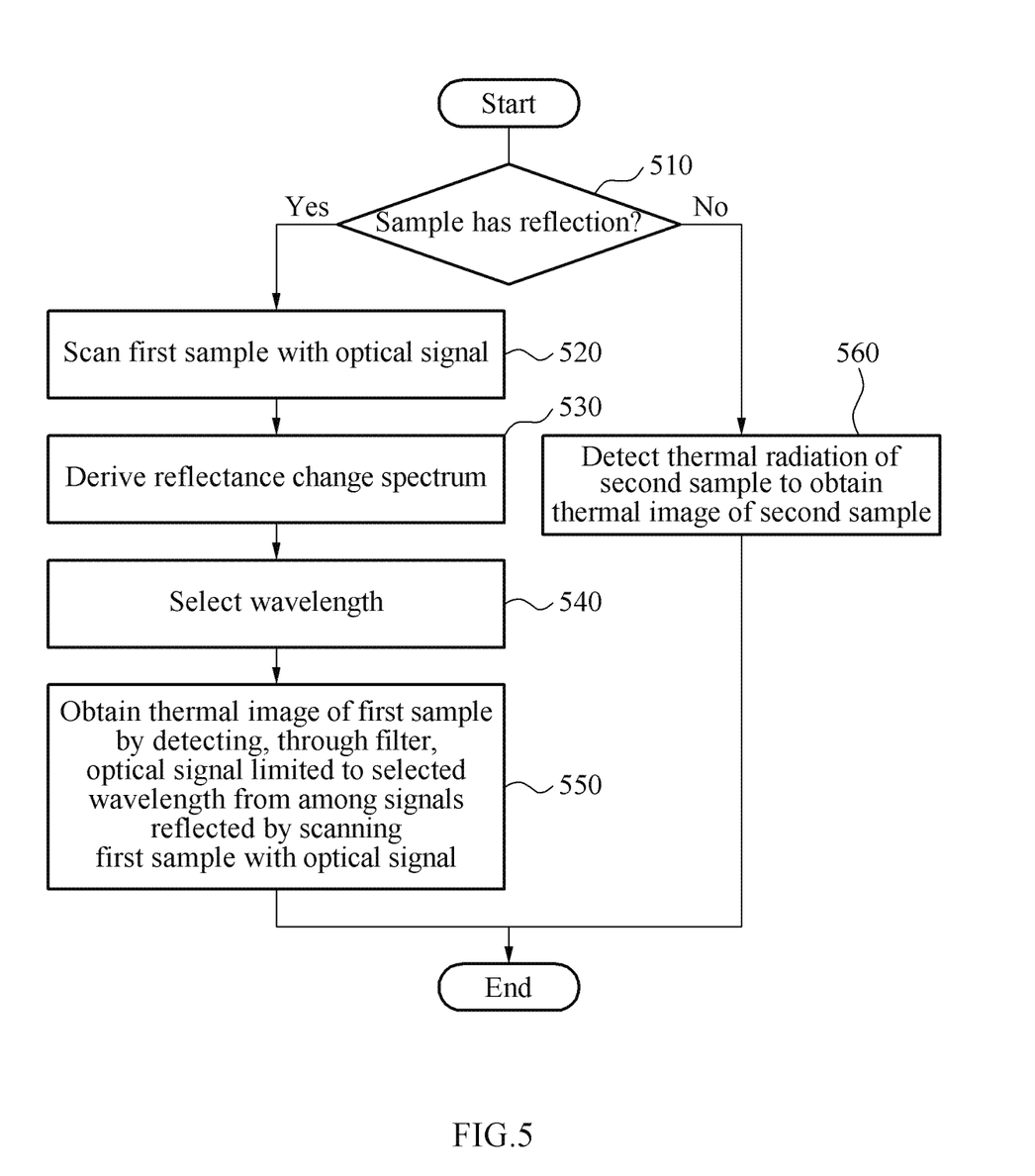
FIG. 5 is a flowchart illustrating an operation method of a multi-mode thermal imaging device according to an embodiment.

FIG. 5 is a flowchart illustrating an operation method of a multi-mode thermal imaging device according to an embodiment.

Referring to FIG. 5, the multi-mode thermal imaging device 100 operates in a different mode by determining whether a sample has a reflection in operation 510. As shown in the example shown in FIG. 5, the multi-mode thermal imaging device 100 operates in a first mode if the sample has reflected light in a visible or near-infrared band, and operates in a second mode if the sample has little or no reflected light. The multi-mode thermal imaging device 100 may operate in a first operation mode or a second operation mode in response to a user selection. Operation 510 may be expressed as selecting or determining a mode according to the characteristics of the sample by the multi-mode thermal imaging device 100.

In operation 520, the multi-mode thermal imaging device 100 scans a first sample with an optical signal from the light source 110-1 in the first mode. Here, the first sample is a sample having reflected light in a visible or near-infrared band.

In operation 530, the multi-mode thermal imaging device 100 detects the signals reflected from the first sample by separating them for each wavelength, and derives a reflectance change spectrum according to the wavelength on the basis of the signals detected separately for each wavelength.

In operation 540, the multi-mode thermal imaging device 100 selects a wavelength on the basis of the derived reflectance change spectrum.

In operation 550, the multi-mode thermal imaging device 100 obtains a thermal image of the first sample by detecting, through a filter, an optical signal limited to the selected wavelength by scanning the first sample with the optical signal from the light source 110-1. Here, the filter includes the linear variable filter 120-2.

In operation 560, the multi-mode thermal imaging device 100 detects thermal radiation of a second sample to obtain a thermal image of the second sample in the second mode. Here, the second sample is a sample having little or no reflected light.

The description provided with reference to FIGS. 1 to 4 also applies to the description of FIG. 5, and thus a detailed description will be omitted for conciseness.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A multi-mode thermal imaging device, comprising:
    a microscope;
    a spectroscope;
    a controller; and
    an infrared thermal imager,
    wherein the multi-mode thermal imaging device operates in one of multiple modes,
    wherein in a first mode among the multiple modes, the microscope scans a first sample with an optical signal from a light source, the spectroscope detects signals reflected from the first sample by separating them for each wavelength, and the controller derives a reflectance change spectrum according to the wavelength on the basis of the signals detected separately for each wavelength, selects a wavelength on the basis of the derived reflectance change spectrum, and obtains a thermal image of the first sample by detecting, through a filter, an optical signal limited to the selected wavelength from among the signals reflected from the first sample, and
    wherein in a second mode among the multiple modes, the infrared thermal imager detects thermal radiation of a second sample to obtain a thermal image of the second sample.

2. The multi-mode thermal imaging device of claim 1, wherein the light source corresponds to a white light source.

3. The multi-mode thermal imaging device of claim 1, wherein in the first mode, the controller obtains a reflectance change for each wavelength by analyzing the signals detected separately for each wavelength in a frequency domain, and derives the reflectance change spectrum by mapping the reflectance change obtained for each wavelength to each wavelength.

4. The multi-mode thermal imaging device of claim 1, wherein in the first mode, the controller selects a wavelength maximizing a reflectance change in the derived reflectance change spectrum.

5. The multi-mode thermal imaging device of claim 1, wherein in the first mode, the controller analyzes, in a frequency domain, the optical signal limited to the selected wavelength from among the signals reflected from the first sample by the scanning with the optical signal from the light source, and obtains the thermal image of the first sample through a result of the analyzing.

6. The multi-mode thermal imaging device of claim 1, wherein in the second mode, a sliding mirror and an infrared object lens in the multi-mode thermal imaging device are aligned.

7. The multi-mode thermal imaging device of claim 1, further comprising:
    a power supply configured to apply an alternating current (AC) bias signal or a direct current (DC) bias signal to the first sample or the second sample;
    a sliding mirror; and
    an infrared object lens,
    wherein the infrared thermal imager detects the thermal radiation through the sliding mirror and the infrared object lens.

8. The multi-mode thermal imaging device of claim 7, wherein the power supply applies the AC bias signal to the first sample in the first mode and applies the DC bias signal to the second sample in the second mode.

9. An operation method of a multi-mode thermal imaging device, the operation method comprising:
    in a first mode among multiple modes,
        scanning a first sample with an optical signal;
        detecting signals reflected from the first sample by separating them for each wavelength, and deriving a reflectance change spectrum according to the wavelength on the basis of the signals detected separately for each wavelength;
        selecting a wavelength on the basis of the derived reflectance change spectrum; and
        obtaining a thermal image of the first sample by detecting, through a filter, an optical signal limited to the selected wavelength from among the signals reflected from the first sample, and
    in a second mode among the multiple modes,
        detecting thermal radiation of a second sample to obtain a thermal image of the second sample.

* * * * *